United States Patent [19]
Schotter

[11] Patent Number: 5,385,319
[45] Date of Patent: Jan. 31, 1995

[54] MISSILE WITH INSIDE PAYOUT OPTICAL FIBER CANISTER

[75] Inventor: Daniel K. Schotter, Tucson, Ariz.

[73] Assignee: Hughes Missile Systems Company, Los Angeles, Calif.

[21] Appl. No.: 155,270

[22] Filed: Nov. 22, 1993

[51] Int. Cl.$^6$ .............................................. F41G 7/32
[52] U.S. Cl. .................................................. 244/3.12
[58] Field of Search ............... 244/3.12; 242/159, 170, 242/171, 172, 173, 174, 175; 89/1.34

[56] References Cited

U.S. PATENT DOCUMENTS

| | | | |
|---|---|---|---|
| 3,319,781 | 5/1967 | Simpson et al. | 244/3.12 |
| 5,022,607 | 6/1991 | Schotter | 244/3.12 |
| 5,100,078 | 3/1992 | Clark | 242/171 |
| 5,167,382 | 12/1992 | Rochester et al. | 244/3.12 |
| 5,181,270 | 1/1993 | Hsu et al. | 244/3.12 |
| 5,189,253 | 2/1993 | LeCompte | 244/3.12 |

Primary Examiner—Ian J. Lobo
Attorney, Agent, or Firm—Randall M. Heald; Charles D. Brown; Wanda K. Denson-Low

[57] ABSTRACT

A missile includes an optical fiber canister with the optical fiber wound as an annular fiber pack having an initial payout region extending from the inner annular surface. A reinforcing leader overlies the initial payout region of the optical fiber to form a leader composite structure. The leader composite structure is wound into a flat outwardly spiraling coil lying perpendicular to the axis of symmetry of the annular fiber pack, with the outer turn of the spiral leading away from the optical fiber pack. The coil is encased in a mass of potting compound. At the initiation of optical fiber payout, the turns of the coil progressively tear free of the mass of potting compound to achieve a gradual loading of the optical fiber and opening of a path for the axial payout of the portion of the optical fiber not protected by the reinforcing leader.

14 Claims, 3 Drawing Sheets

MISSILE WITH INSIDE PAYOUT OPTICAL FIBER CANISTER

BACKGROUND OF THE INVENTION

This invention relates to optical fiber guided missiles, and, more particularly, to the payout leader configuration for an inside payout optical fiber canister.

After it is launched, a guided missile may remain interconnected with a remote control station by an optical fiber. Performance and navigational information is conveyed from the missile to the control station over the optical fiber, and control commands are conveyed from the control station to the missile over the same optical fiber. The optical fiber is initially wound into an optical fiber pack carried in a canister on the missile. The optical, fiber is unwound from the optical fiber pack and canister and dispensed as the missile flies. Some missiles fly at speeds of 500 miles per hour or more, and great care must be taken to avoid causing the optical fiber to fail. A single failure of the optical fiber can cause the entire mission to be unsuccessful.

An optical fiber pack is formed of a plurality of annular layers of the optical fiber. The canister can be constructed so that the optical fiber pays out from either the inside surface of the optical fiber pack or the outside surface. The inside payout canister has the advantage that the payout is more linear, and there is less circumferential momentum of the optical fiber during payout.

One of the problems encountered for both inside and outside payout canisters is the initial payout of the optical fiber. From rest upon its launcher, the missile is rapidly accelerated to high speed. Unless care Is taken, the optical fiber can be severely twisted or bent, or otherwise deformed, so as to lead to breakage of the optical fiber. Another concern is that the aft end of the optical fiber pack can be damaged by hot gas from the missile engine, particularly during the initial phases of flight.

There is a need for an improved approach to the initiation of the optical fiber payout. The present invention fulfills this need, and further provides related advantages.

SUMMARY OF THE INVENTION

The present invention provides an improved missile with an inside payout optical fiber canister. The optical fiber canister has a payout leader which protects the portion of the optical fiber that is first payed out, and aids in achieving a smooth initial payout. The leader structure also protects the optical fiber pack against damage resulting from the hot engine exhaust gases, where present. This approach can be used for missiles that fly through the air, above the air, and underwater (i.e., a torpedo).

In accordance with the invention, a missile comprises a missile body having a missile body axis and an optical fiber canister fixed within the body of the missile. The optical fiber canister comprises a cylindrically symmetric, annular optical fiber pack comprising a plurality of layers of optical fiber. The annular optical fiber pack has an inner annular surface, an outer annular surface, and a first longitudinal end. The annular optical fiber pack is further defined as having a fiber pack cylindrical axis of symmetry. The optical fiber pack has an initial payout region of the optical fiber extending from the inside annular surface of the optical fiber pack. A reinforcing leader overlies and is fixed to the initial payout region of the optical fiber to form a leader composite structure. The leader composite structure is arranged in an outwardly spiraling coil lying adjacent to the first longitudinal end of the optical fiber pack. The spiral coil may be encased in potting compound to hold it in position. Preferably, an outer shroud overlies and is fixed to the outer annular surface of the optical fiber pack.

The spiral coil of the leader composite structure assists in attaining a smooth initial payout of the optical fiber. Mechanical stressing of the optical fiber during this period is minimized, reducing the likelihood that the optical fiber could fail during initiation of the payout sequence. As the leader composite structure is pulled free of the spiral coil during payout, it opens a path for subsequent payout of the later turns of optical fiber from the optical fiber pack.

The spiral coil at the first longitudinal of the fiber pack also protects the optical fiber pack from any hot engine exhaust gases during the initiation of the missile flight. The leader is preferably formed as a leader tube overlying the optical fiber, a plurality of stiffeners overlying the leader tube and staggered along its length, and a leader Jacket overlying the plurality of stiffeners. The leader thus acts as an armored covering over the optical fiber, and also protects the optical fiber pack prior to its payout.

In another embodiment of the invention, a missile, comprises a missile body having a missile body axis and an optical fiber canister fixed within the body of the missile. The optical fiber canister comprises a cylindrically symmetric, annular optical fiber pack comprising a plurality of layers of optical fiber. The annular optical fiber pack has an inner annular surface, an outer annular surface, and a first longitudinal end. The annular optical fiber pack is further defined as having a fiber pack cylindrical axis of symmetry. An outer shroud overlies and is fixed to the outer annular surface of the optical fiber pack. An initial payout region of the optical fiber extends from the inside annular surface of the optical fiber pack. A reinforcing leader overlies and is fixed to the initial payout region of the optical fiber to form a leader composite structure. An outwardly spiraling coil of the leader composite structure lies adjacent to the first longitudinal end of the optical fiber pack. The coil is a flat coil lying in a plane perpendicular to the cylindrical axis of symmetry of the annular optical fiber pack. A mass of potting compound overlies the first longitudinal end of the fiber pack and encloses the coil of the leader composite structure.

The missile of the invention provides an advance in the art of optical fiber guided missiles. The canister design for payout of the optical fiber utilizes inside payout and an armored leader. Additionally, the leader also protects the entire optical fiber pack from hot gas damage. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
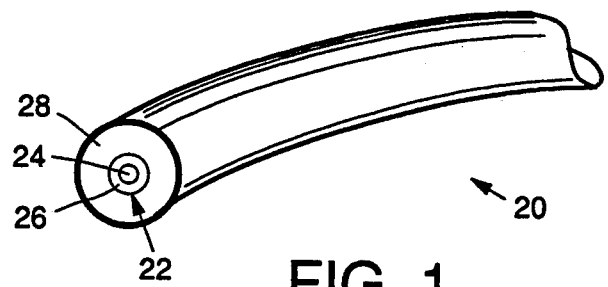
FIG. 1 is a perspective view of an optical fiber.

The present invention deals with a missile and the payout of an optical fiber from the missile. An optical fiber 20, illustrated in FIG. 1, includes a strand 22 of glass fiber. The strand 22 includes a core glass 24 and a casing glass 26. The strand 22 is coated with a polymer layer termed a buffer 28 to protect the glass from scratching or other damage. As an example of the dimensions, in one version the diameter of the glass strand 22 is about 125 micrometers, and the diameter of the optical fiber 20 is about 250 micrometers.

Figure 2:
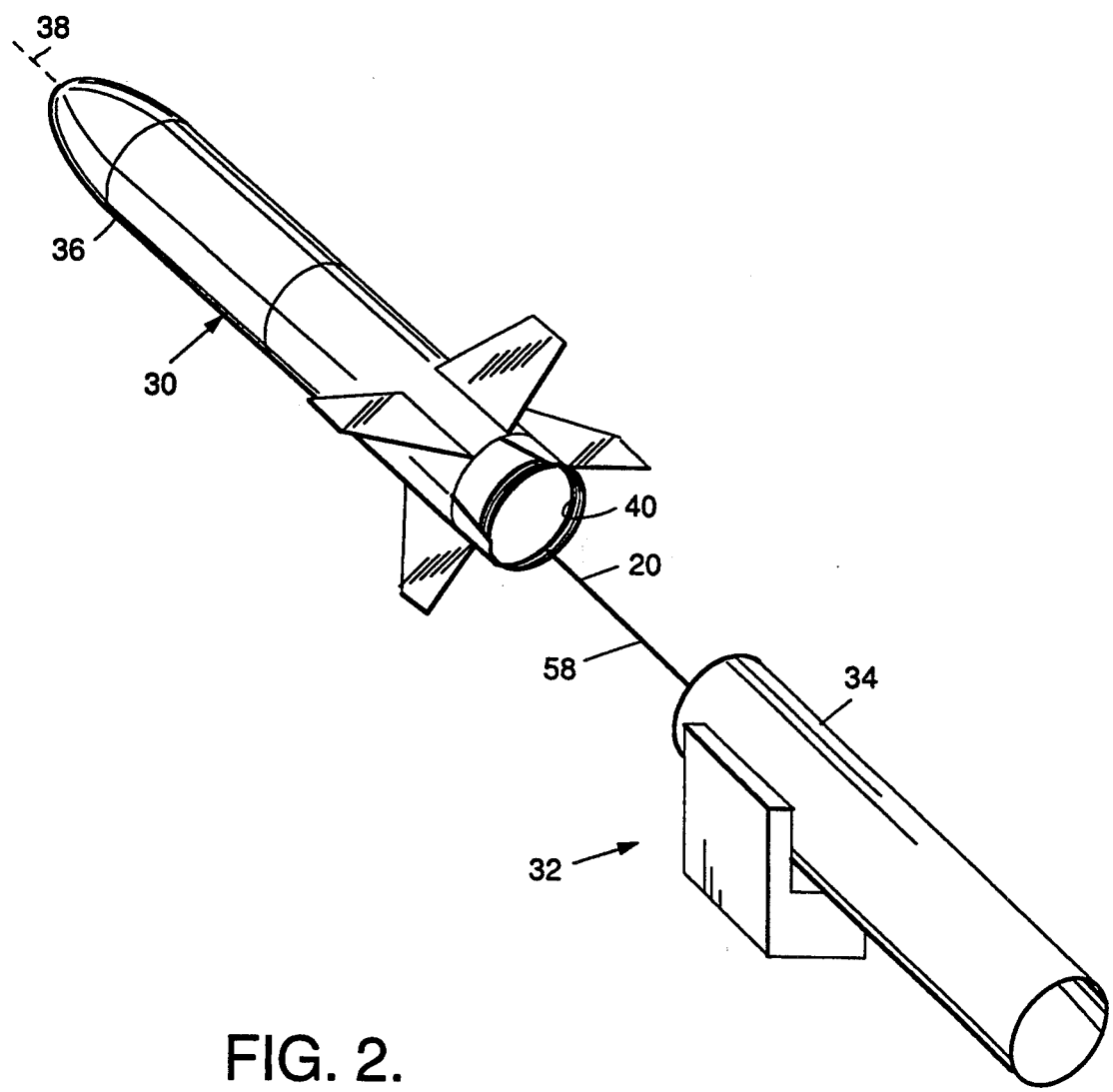
FIG. 2 is a perspective view of a missile being launched from a launcher, with an optical fiber extending between the missile and the launcher.

FIG. 2 depicts a missile 30 that is launched from a launch site 92, in this case a launch tube 24. The missile includes a missile body 36 having a missile body axis 38. An optical fiber canister 40 containing a length of the optical fiber 20 is fixed within the missile body 96. As the missile 30 flies through the air, the optical fiber 20 is dispensed from the canister 40. The optical fiber extends between a missile control system in the missile 30 and a launch site controller at the launch site 32. Information is transmitted bidirectionally between the two ends of the optical fiber 20.

The present invention deals with the optical fiber payout structure and apparatus, and not with the transmittal or use of information over the optical fiber. The optical fiber may also be simultaneously payed out from a canister at the launch site, and the structure and apparatus of that canister can be the same as will be subsequently described for the canister 40. FIG. 2 depicts the optical fiber canister 40 as paying out directly from its aft end through the aft end of the missile. Alternatively, the payout may be from the forward end of the canister, or through a payout guiding tube. The canister may be oriented with its axis parallel to that of the missile, or transverse, or otherwise.

Figure 3:
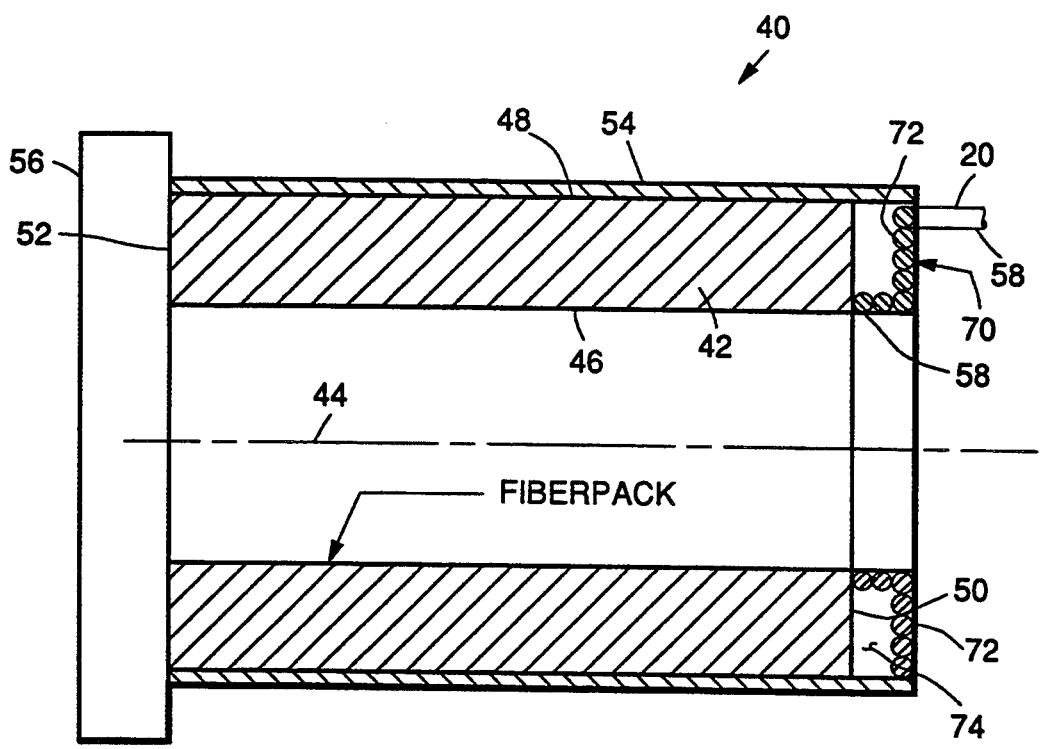
FIG. 3 is a side sectional view of an optical fiber canister having a flat-ended fiber pack configuration.

FIG. 3 depicts one embodiment of the canister 40 in more detail. The canister includes an annular optical fiber pack 42. The optical fiber pack 42 is formed as a plurality of layers, each overlying the prior layer, of side-by-side turns of the optical fiber 20. The optical fiber pack 42 is prepared by winding a layer comprising a plurality of turns of the optical fiber in a side-by-side fashion onto a mandrel. When one layer is complete, the next layer is laid on top in a similar fashion. An adhesive may be used to hold the turns and layers in place. The optical fiber pack 42 is in the form of a cylindrically symmetric annulus having a cylindrical axis 44, which may but not necessarily coincide with the missile axis 38. The optical fiber pack 42 further has an inner annular surface 46, an outer annular surface 48, a first longitudinal end 50, and a second longitudinal end 52.

The canister 40 of FIG. 3 is an inside payout canister, wherein the optical fiber 20 is dispensed from the layer at the inner annular surface 46. As payout progresses and each layer is dispensed, the diameter of the inner annular surface 46 increases and the diameter of the outer annular surface remains constant. Another type of canister is an outside payout canister, wherein the optical fiber is dispensed from the layer at the outer annular surface of the optical fiber pack. In an outside payout canister, the outer annular diameter decreases as payout progresses and the inner annular diameter remains constant.

The outer annular surface 48 is fixed to an outer shroud 54 that covers and protects the optical fiber pack 42. A flange 56 is fixed to the outer shroud 54 adjacent to the second longitudinal end 52 of the optical fiber pack 42. The flange 56 is used to attach the optical fiber canister 40 to the internal structure of the missile 30, and is typically provided with a bolt pattern for this purpose.

Figure 4:
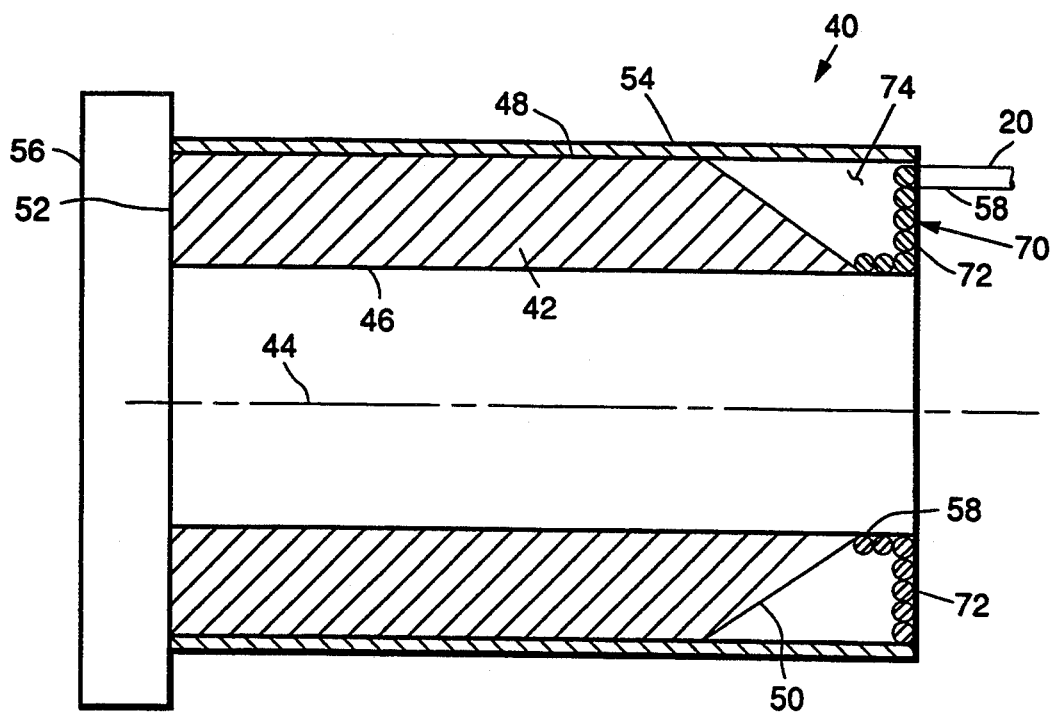
FIG. 4 is a side sectional view of an optical fiber canister having a step-back fiber pack configuration.

In the embodiment of the canister 40 shown in FIG. 3, the optical fiber at the first longitudinal end 50 lies in a plane perpendicular to the cylindrical axis 44. The embodiment of the canister 40 shown in FIG. 4 is similar to that of FIG. 3, except that the optical fiber is arranged in a stepped back fashion at the first longitudinal end 50. The present invention is equally applicable to both canister embodiments, and to other winding configurations.

When the missile 30 is first launched, as depicted in FIG. 2, there are two significant problems in respect to the optical fiber. One is that the hot exhaust gases from the engine of the missile may backwash against the optical fiber pack 42 and damage any exposed portion of the optical fiber 20. The second is that, unless care is taken with the portion of the optical fiber that is first payed out, the sudden jerky acceleration and mechanical stresses and strains imposed upon the optical fiber can damage it. The present approach solves both of these problems.

Most of the length of optical fiber 20 is not separately depicted in FIG. 3, but an initial payout region 58 of the optical fiber 20 is highlighted (and shown larger than actual size for illustrative purposes). The initial payout region 58 includes the portion of the optical fiber 20 wound onto the optical fiber pack 42 that is first dispensed, and also includes the length of the optical fiber 20 that initially extends from the optical fiber pack 42 that reaches back to the launch site 32.

Figure 5:
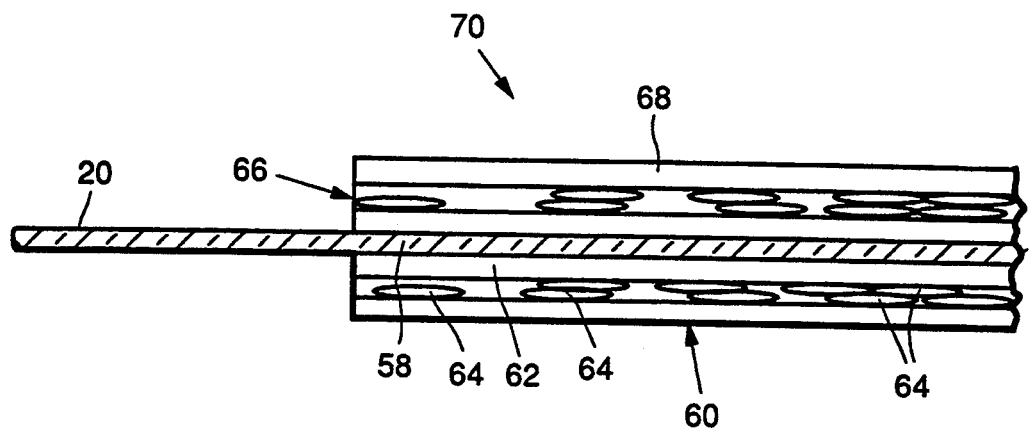
FIG. 5 is a sectional view of a reinforcing leader overlying an optical fiber, to form a leader composite structure.

At least a portion of the initial payout region 58 is protected by a reinforcing leader 60. Various leader structures are known, and a preferred structure of the leader 60 is shown in FIG. 5. The leader includes a leader tube 62 overlying and fixed to the optical fiber 20 in the initial payout region 58. The leader tube is preferably made of teflon (polytetrafluoroethylene). Overlying the leader tube 62 are a plurality of stiffeners 64 in the form of steel filaments. The stiffeners 64 are staggered along the length of the initial payout region 58, with the number of stiffeners decreasing adjacent to a transition 66 between the initial payout region 58 that is protected by the leader 60 and the balance of the optical fiber 20 that is not protected by leader. The decrease in the stiffness of the reinforcing leader 60 near the transition 66 decreases the likelihood that damage will occur to the optical fiber 20 in the region of the transition. A leader jacket 68 made of kevlar overlies the stiffeners 64 and holds them in place. This leader structure is known in the art, and is described in more detail in U.S. Pat. No. 5,022,607, whose disclosure is incorporated by reference. The initial payout region 58 of the optical fiber 20 and the overlying reinforcing leader 60 are together termed a leader composite structure 70.

Referring again to FIGS. 3 and 4, in the missile of the invention a portion of the length the leader composite structure 70 is arranged as an outwardly spiraling coil 72 adjacent to the first longitudinal end 52 of the optical fiber pack 42. Most preferably, the spiral coil is planar, and in a plane perpendicular to the fiber pack cylindrical axis 44. The spiral coil 72 is held in place within a mass of a potting compound 74. The potting compound is a flowable and curable polymeric material that in its initial fluid form can be flowed around the spiral coil after it is wound, and then hardens by curing with the passage of time to form the cured solid mass of potting compound 74. Desirably, the cured potting compound is an elastomeric polymer having a somewhat rubbery consistency to permit the subsequent removal of the optical fiber during payout (to be discussed below). The potting compound is preferably any of the known room temperature vulcanizing (RTV) polymers such as the commercially available Dow-Corning Type 7600 material.

The potted fiber pack structure may be formed by placing the optical fiber pack 42 within the shroud 54 with the first longitudinal end 50 facing upwardly. A portion of the leader composite structure 70 is wound into the shape of the spiral coil 72, with a free end extending outwardly. The potting compound is provided as a curable fluid and poured over this spiral coil 72, and subsequently allowed to cure to form an integral end structure for the canister 40.

The end structure of the canister 40, having the spiral coil 72 of leader composite structure 70 within a mass of potting compound 74 effectively protects the optical fiber pack 42 from damage. The jacket 68 of the leader composite structure 70 is resistant to attack by corrosive agents and hot gas, and the Jacket 68 and stiffeners 64 protect against impact from particles and the like. By the time that the spiral coil begins to unwind, the aft end of the missile has separated from the launch tube 34, so that the likelihood of damage to the optical fiber pack is reduced. The Jacket also protects the optical fiber from excessive bending.

As the dispensing of the optical fiber begins upon launch of the missile, the spiral coil 72 is gradually torn out of the potting compound, which is chosen in part for its ability to be parted by the payout forces. The tearing of the spiral coil 72 out of the solid potting compound 74 acts in a manner analogous to a shock absorber to cushion the optical fiber against the shock of the sudden acceleration upon missile launch. The tearing away of the potting compound 74 also opens a pathway for the optical fiber 20 to be dispensed as the inside payout continues and the diameter of the inner annular surface 46 gradually increases.

Figure 6:
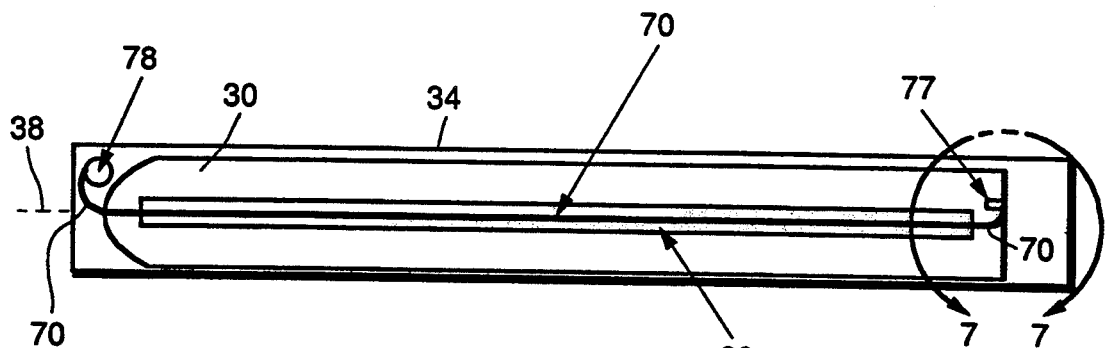
FIG. 6 is a cutaway view of a missile inside a launch tube.
Figure 7:
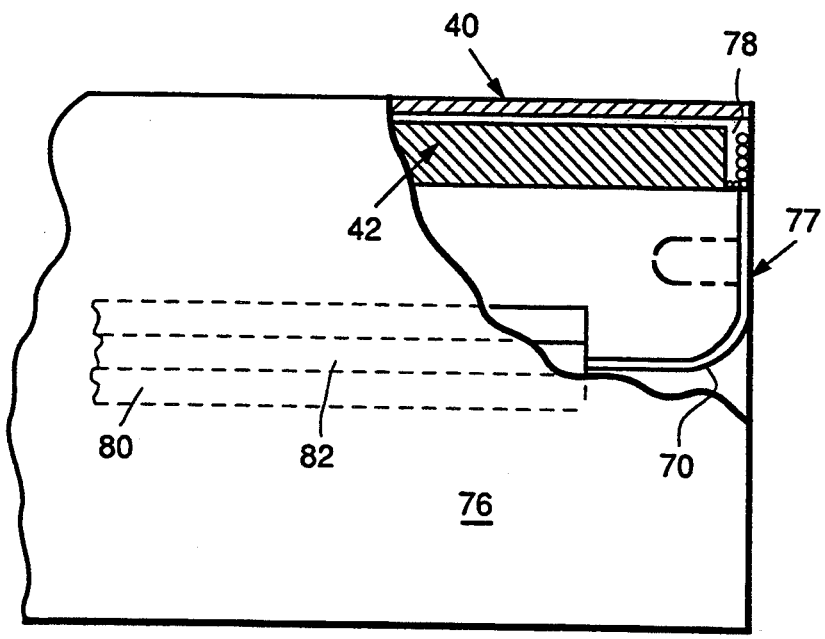
FIG. 7 is a detail of FIG. 6 taken in the region 7—7.

A further feature of the initial dispensing approach is shown in FIGS. 6 and 7. FIG. 6 shows the missile 80 within the launch tube 34, prior to launch. A portion of the leader composite structure 70 extends to an outer surface 76 of the missile body 36 through a slot 77 and thence to an anchor block 78 in the interior of the launch tube 34. A retainer strip 80 in the shape of a channel made of aluminum is affixed to the outer surface 76 and extends along a portion of the length of the body 36 parallel to the missile body axis 38. As shown in the detail view of FIG. 7, a portion of the length of the leader composite structure 70 is captured within the retainer strip 80 and held In place with an overlying piece of tape 82. As the missile is launched, the retainer strip 80 guides the initial dispensing of the optical fiber 20 (within the leader composite structure 70). As the leader composite structure 70 is pulled free of the retainer strip 80 during launch, the tape 82 gradually tears so that the acceleration of the leader composite structure is cushioned. This retainer strip approach is known in the art, and is described in U.S. Pat. No. 5,022,607.

The present approach provides an improved missile with optical fiber control, having a reduced likelihood of damage to the optical fiber during missile launch. Although a particular embodiment of the invention has been described in detail for purposes of illustration, various modifications may be made without departing from the spirit and scope of the invention. Accordingly, the invention is not to be limited except as by the appended claims.

What is claimed is:

1. A missile, comprising
   a missile body having a missile body axis; and
   an optical fiber canister fixed within the body of the missile, the optical fiber canister comprising:
   a cylindrically symmetric, annular optical fiber pack comprising a plurality of layers of optical fiber, the annular optical fiber pack having an inner annular surface, an outer annular surface, and a first longitudinal end, the annular optical fiber pack further being defined as having a fiber pack cylindrical axis of symmetry,
   an initial payout region of the optical fiber extending from the inside annular surface of the optical fiber pack,
   a reinforcing leader overlying and fixed to the initial payout region of the optical fiber to form a leader composite structure, and
   an outwardly spiraling coil of the leader composite structure lying adjacent to the first longitudinal end of the optical fiber pack.

2. The missile of claim 1, wherein the optical fiber canister further includes
   an outer shroud overlying and fixed to the outer annular surface of the optical fiber pack.

3. The missile of claim 1, wherein the reinforcing leader comprises
   a leader tube overlying the optical fiber,
   a plurality of stiffeners overlying the leader tube and staggered along its length, and
   a leader jacket overlying the plurality of stiffeners.

4. The missile of claim 1, wherein the coil of the leader composite structure is a flat coil lying in a plane perpendicular to the cylindrical axis of symmetry of the annular optical fiber pack.

5. The missile of claim 1, wherein the optical fiber canister further includes
   a mass of potting compound overlying the first longitudinal end of the fiber pack and enclosing the coil of the leader composite structure.

6. The missile of claim 1, wherein the optical fiber canister further includes
   a leading end of the leader composite structure extending from an outer turn of the spiral coil.

7. The missile of claim 6, further including
   a retainer strip lying on an outer surface of the missile body and parallel to the axis of the missile, and
   a portion of the leading end of the leader composite structure retained in the retainer strip.

8. A missile, comprising:
   a missile body having a missile body axis; and
   an optical fiber canister fixed within the body of the missile, the optical fiber canister comprising a cylindrically symmetric, annular optical fiber pack comprising a plurality of layers of optical fiber, the annular optical fiber pack having an inner annular surface, an outer annular surface, and a first longitudinal end, the annular optical fiber pack further being defined as having a fiber pack cylindrical axis of symmetry, an outer shroud overlying and fixed to the outer annular surface of the optical fiber pack, an initial payout region of the optical fiber extending from the inside annular surface of the optical fiber pack, a reinforcing leader overlying and fixed to the initial payout region of the optical fiber to form a leader composite structure, an outwardly spiraling coil of the leader composite structure lying adjacent to the first longitudinal end of the optical fiber pack, the coil being a flat coil lying in a plane perpendicular to the cylindrical axis of symmetry of the annular optical fiber pack, and a mass of potting compound overlying the first longitudinal end of the fiber pack and enclosing the coil of the leader composite structure.

9. The missile of claim 8, wherein the optical fiber canister further includes
a leading end of the leader composite structure extending from an outer turn of the spiral coil.

10. The missile of claim 9, further including
a retainer strip lying on an outer surface of the missile body and parallel to the axis of the missile, and
a portion of the leading end of the leader composite structure retained in the retainer strip.

11. The missile of claim 8, wherein the first longitudinal end of the optical fiber pack lies in a plane parallel to the plane of the spiraling coil.

12. The missile of claim 8, wherein the first longitudinal end of the optical fiber pack has a stepped back configuration.

13. The missile of claim 8, wherein the reinforcing leader comprises:
a leader tube overlying the optical fiber,
a plurality of stiffeners overlying the leader tube and staggered along its length, and
a leader Jacket overlying the plurality of stiffeners.

14. The missile of claim 8, wherein the potting compound is a cured elastomeric polymer.

* * * * *